United States Patent
Schuler et al.

(10) Patent No.: US 6,442,467 B1
(45) Date of Patent: Aug. 27, 2002

(54) METHOD FOR CONTROLLING AN AUTOMATIC TRANSMISSION

(75) Inventors: Franz-Josef Schuler, Kressbronn; Wolfgang Vallaster, Meckenbeuren; Adolf Bucher, Kressbronn, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/787,878

(22) PCT Filed: Sep. 22, 1999

(86) PCT No.: PCT/EP99/07042

§ 371 (c)(1),
(2), (4) Date: Mar. 22, 2001

(87) PCT Pub. No.: WO00/19129

PCT Pub. Date: Apr. 6, 2000

(30) Foreign Application Priority Data

Sep. 28, 1998 (DE) .......................... 198 44 375

(51) Int. Cl.⁷ .................. B60K 41/06; F16H 61/08; F16H 59/10
(52) U.S. Cl. .................. 701/51; 701/55; 477/133; 477/136
(58) Field of Search ............... 701/51, 55, 56; 192/3, 31; 477/133, 136, 62, 63, 126, 129, 65, 98, 99, 163, 115, 154, 138, 139, 140

(56) References Cited

U.S. PATENT DOCUMENTS

| | | | | |
|---|---|---|---|---|
| 4,148,231 A | * | 4/1979 | Redzinski | 74/866 |
| 4,208,925 A | * | 6/1980 | Miller et al. | 74/866 |
| 4,896,565 A | * | 1/1990 | Simonyi et al. | 74/731 |
| 5,024,125 A | * | 6/1991 | Baba | 74/866 |
| 5,048,373 A | * | 9/1991 | Sumimoto et al. | 74/866 |
| 5,315,897 A | | 5/1994 | Abe et al. | 477/98 |
| 5,411,449 A | | 5/1995 | Takahashi et al. | 477/120 |
| 5,499,953 A | | 3/1996 | Hayasaki | 477/120 |
| 5,501,644 A | * | 3/1996 | Zhang | 477/97 |
| 5,545,108 A | * | 8/1996 | Wagner et al. | 477/125 |
| 5,571,060 A | * | 11/1996 | Becker et al. | 477/159 |
| 6,176,811 B1 | * | 1/2001 | Popp et al. | 477/115 |

FOREIGN PATENT DOCUMENTS

| | | |
|---|---|---|
| DE | 31 44 845 A1 | 12/1982 |
| DE | 35 39 684 A1 | 5/1986 |
| DE | 42 19 362 A1 | 12/1992 |
| DE | 39 22 051 C2 | 7/1993 |
| DE | 43 33 583 A1 | 4/1994 |
| DE | 44 19 753 A1 | 4/1995 |
| DE | 196 48 383 A1 | 5/1998 |
| EP | 0 569 668 A1 | 11/1993 |
| WO | 96/28670 | 9/1996 |

* cited by examiner

Primary Examiner—Tan Nguyen
Assistant Examiner—Dalena Tran
(74) Attorney, Agent, or Firm—Davis & Bujold, P.L.L.C.

(57) ABSTRACT

A method for controlling an automatic transmission having several gears in which a downshift to a lower gear is triggered when, during an actuation of the acceleration pedal toward an increase of the load input, a shifting characteristic line is exceeded. It is proposed to compare an accelerator pedal gradient signal (DKIG) with a presettable threshold value (DKIG_Limit) and to trigger a downshift already before the shifting characteristic line is exceeded when the actual value of the accelerator pedal gradient signal is great than the threshold value. This significantly reduces the reaction time of the transmission.

7 Claims, 1 Drawing Sheet

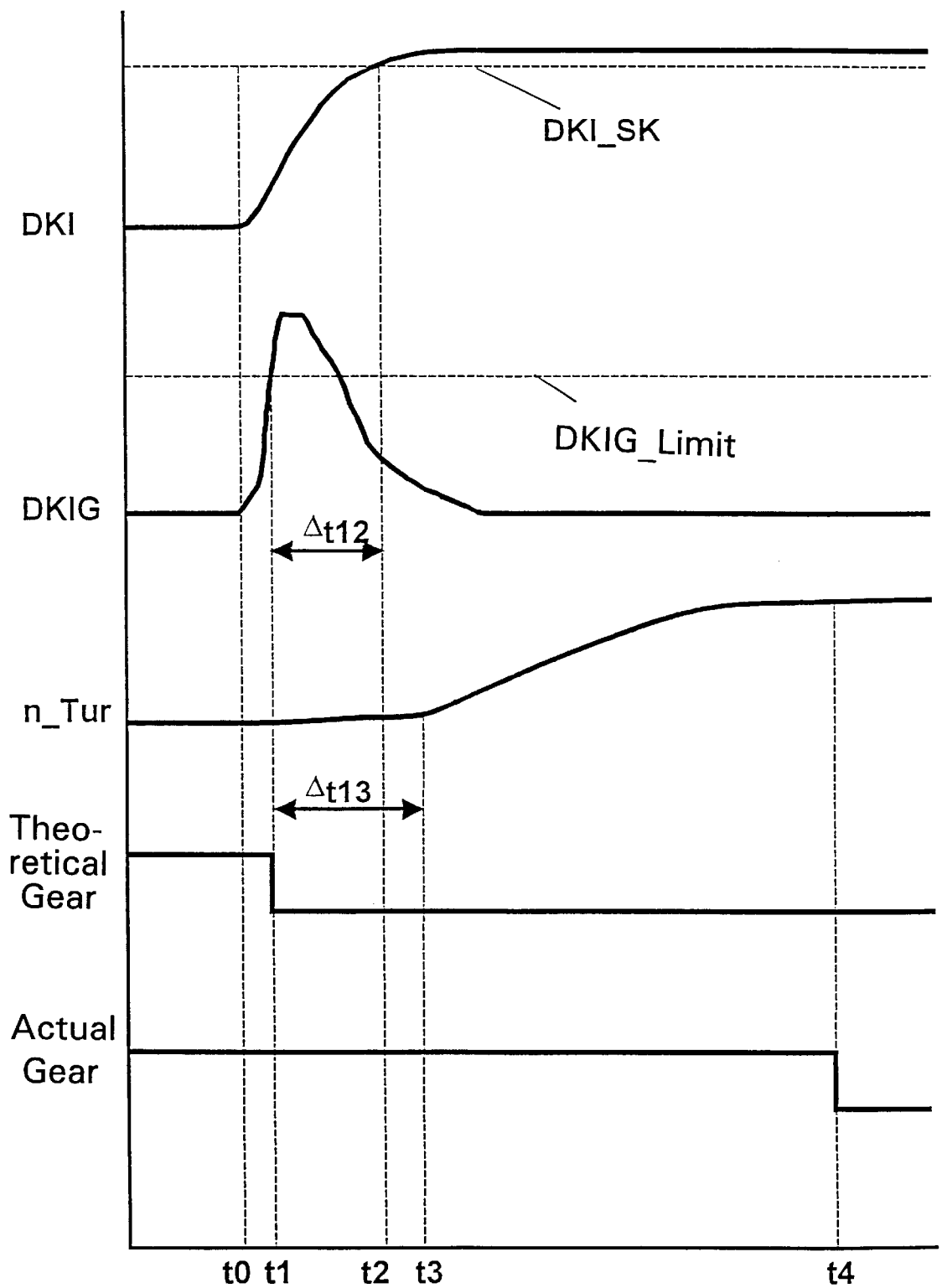

METHOD FOR CONTROLLING AN AUTOMATIC TRANSMISSION

According to the preamble of claim 1, the invention relates to a method for control of an automatic transmission.

In the electronic control device of modem automatic transmission, several shifting programs are usually stored. One shifting program usually contains a set of shifting characteristic lines. Each shifting characteristic line contains for a certain gear change, such as from third gear to fourth gear, the information as at what speed or rotational speed and at what load input or accelerator pedal position the gear change is triggered.

DE 39 22 051 02 discloses a method in which a gradient signal is determined from the signal of the accelerator pedal position and, depending on the value of said gradient, a performance optimized shifting program is adopted. This method is adequate to make a shifting program, with high shifting rotational speeds and corresponding traction excesses which can be desired, e.g. during an overtaking operation, spontaneously available to a driver.

The basic problem of an automatic transmission consists in that after triggering the gear shift a certain period of time elapses until the change of ratio. This period of time is needed, in electrohydraulically controlled transmissions, for filling a clutch to be engaged and/or for lowering the pressure level of a disengaging clutch. Particularly, when the driver quickly increases the load and expects a downshift, this time period is disturbing, since the transmission noticeably reacts only with a delay.

By a method such as disclosed, e.g. in DE 196 48 383 A1, the time period can be shortened within certain limits in order to increase the spontaneity of the transmission.

The problem to be solved by the invention is to achieve a further increase of the spontaneity of the transmission.

According to the invention this problem is solved by a method having the features of the characteristic part of the main claim. Advantageous developments of the method are given in the sub-claims.

With the aid of a gradient signal, the speed of change of the performance control device (accelerator pedal) is monitored. If the value of the gradient signal, during a quick depression of the accelerator pedal, exceeds a presettable threshold value, a downshift is triggered immediately before the shifting characteristic line has been exceeded. The transmission reacts prior to the time period which otherwise would elapse before exceeding the shifting characteristic line. In a driving situation in which, departing from a low load position of, e.g. 10% of the full load position, the accelerator pedal is quickly depressed and the downshift would be triggered only at a high load position, e.g. of 90% of the full load position, a shortening of the reaction time of the transmission of about 200 ms can be achieved.

The invention makes use of the knowledge that when the accelerator pedal is depressed at a specific speed, as a rule, it is actuated to a high load position which, in any case, would cause a downshift as a consequence.

In the less frequent case in which the characteristic line after the appearance of a high gradient value is still not exceeded, in an advantageous development of the invention, the downshift is again interrupted when the actual value of the gradient signal falls below another threshold value before the shifting characteristic line has been exceeded. Therefore, when the actuation speed decreases and falls below the other threshold value, it is concluded that the shifting characteristic line has probably not been exceeded and the downshift is interrupted. In an overlapping gear shift, where one clutch is engaged and one clutch disengaged, the interruption of the downshift is usually possible up to the moment in which slip appears on the disengaging clutch. The threshold value below which the downshift is again interrupted can be, e.g. equal to the threshold value above which the downshift is triggered, whereby a simplification of the adaptation results.

The adjustment of the threshold values has considerable influence on the behavior of the transmission. In order better provide for the behavior of different types of drivers, it is advantageous if the threshold values for the gradient signal depend on a driving activity parameter which usually is brought up for changing between different shifting programs.

When the threshold values for the gradient signal can be preset according to the actual gear, a further improvement of the transmission behavior can be achieved. For example, it is convenient to preset higher threshold values for the lower gears in order to prevent undesired downshifts which have a stronger effect in the lower gears on account of the greater ratio change.

As a consequence of the gradient threshold values having been exceeded, when the downshift is triggered only when the transmission temperature is within a presettable threshold range, the disadvantage of undesired high engine rotational speeds in cold or very hot transmissions is prevented. The limited value range of the transmission temperature is between 30° C. and 150° C., for example.

Under normal conditions, the output rotational speed of the transmission is proportional to the vehicle speed. When the downshift is triggered only within a presettable value range of the output rotational speed by the proposed function, undesired downshifts are prevented during low speeds usually used within small villages and at very high expressway speeds.

One other advantageous limitation of the state in which a downshift is triggered by the proposed function is given by a presettable value range of the engine torque. The triggering of a downshift only makes sense when operational traction is also present and therefore the engine torque is positive and exceeds a certain value, i.e. 30% of the full load.

Finally, inadmissibly high engine rotational speeds can be prevented by the fact that the downshift already is triggered before exceeding the shifting characteristic line only when the gear to which it should be downshifted is not lower than a gear which still can be introduced during the actual output rotational speed, without producing inadmissibly high engine rotational speeds.

The invention is explained in detail with reference to the enclosed drawing.

The single FIGURE shows in relation to time the signal curves of the accelerator pedal position DKI, the accelerator pedal gradient DKIG, the transmission input rotational speed n_Tur, the theoretical gear and the actual gear.

Departing from a non-accelerated constant drive with a load position of, e.g. DKI=10% of the full load position in an output gear (fourth gear, for example), the driver quickly depresses the accelerator pedal at the t0 moment. In known methods, a downshift would be triggered only at the t2 moment at which the downshift characteristic line has been exceeded. The downshift characteristic line is exceeded, in this example, when the DKI is higher than the DKI_SK threshold value. In known methods, a considerable amount of time elapses between the t0 moment at which the driver begins the load increase up to the t2 moment at which the gearshift would be triggered when exceeding the shifting characteristic line.

In the inventive method, the gradient signal DKIG is compared with the presettable threshold value DKIG_Limit and the downshift is already triggered at the t1 moment when the signal DKIG exceeds the DKIG_Limit. At the t1 moment of triggering the gearshift, the value of the signal theoretical gear changes. Thereafter, until the fourth gear has been introduced, for example, the shifting must now be to the third gear. In the inventive method, the gear shift is triggered earlier by the time interval Δt12. After triggering of the gear shift at the t1 moment for filling of the clutch to be engaged or lowering of the pressure level of the clutch to be disengaged, the time period Δt13 elapses before the driver notices at t3 moment a reaction of the transmission to his load increase. At the t3 moment, the slip phase of the downshift begins in which the transmission input rotational speed n_Tur, and thus the engine rotational speed, quickly increase. At the t4 moment, the signal actual gear indicates that the gearshift has terminated. The signal actual gear has then the same value as the signal theoretical gear.

In this example, the accelerator pedal gradient is used for triggering the downshift. It is easily possible to use other signals, such as an engine torque signal, for this purpose.

References

| | |
|---|---|
| DKI | signal accelerator pedal position |
| DKI_SK | value of the DKI signal in which a downshift characteristic line is exceeded |
| DKIG | signal accelerator pedal gradient |
| DKIG_Limit | threshold value |
| n_Tur | transmission input rotational speed (turbine rotational speed) |
| Soll-Gang | theoretical gear |
| 1st-Gang | actual gear |
| t0 | moment; beginning of the load increase |
| t1 | moment; exceeding of the threshold value |
| t2 | moment; exceeding of the shifting characteristic line |
| t3 | moment; beginning of the slip phase |
| t4 | moment; end of the gearshift |

What is claimed is:

1. A method of controlling of an automatic transmission having several gears controlled by an electronic control device in which a performance control device is provided for load input and a signal (DKI) dependent on a position of a performance control device is detected and a gradient signal (DKIG) proportional to a speed change is formed therefrom, the electronic control device storing at least one shifting characteristic line for each gear change, a shifting characteristic line being associated with every position of the performance control device, and triggering a downshift to a lower gear when, in the actuation of the performance control device, a shifting characteristic line is exceeded in a sense of increased load input, the method comprising the steps of:

comparing the gradient signal (DKIG) with a presettable threshold value (DKG_Limit) and triggering a downshift before exceeding a characteristic line when the actual value of the gradient signal is greater than the threshold value; and interrupting the downshift when the actual value of the gradient signal falls below one other threshold value before the shifting characteristic line is exceeded.

2. The method according to claim 1, further comprising the step of determining, in the electronic control device, a driving activity parameter and with the threshold values for the gradient signal depending on the driving activity parameter.

3. The method according to claim 1, further comprising the step of depending the threshold values for the gradient signal on the actual gear.

4. The method according to claim 1, further comprising the step of only permitting triggering of a downshift, before exceeding the shifting characteristic line, when the transmission temperature is within a presettable value range.

5. The method according to claim 1, further comprising the step of only permitting triggering of a downshift, before exceeding the shifting characteristic line, when the output rotational speed is within a presettable value range.

6. The method according to claim 1, further comprising the step of only permitting triggering of a downshift, before exceeding the shifting characteristic line, when an engine torque is within a presettable value range.

7. The method according to claim 1, further comprising the step of only permitting triggering of a downshift, before exceeding the shifting characteristic line, when a gear to be downshifted to is not a lower gear than a gear that still can be introduced in the actual output rotational speed without producing an inadmissibly high engine rotational speed.

* * * * *